(12) United States Patent
Leung et al.

(10) Patent No.: US 12,235,511 B2
(45) Date of Patent: Feb. 25, 2025

(54) ADAPTER

(71) Applicant: Yinling Leung, Hong Kong (CN)

(72) Inventors: Kwokfai Leung, Hong Kong (CN);
Yinling Leung, Hong Kong (CN);
Weidong Ru, Hong Kong (CN)

(73) Assignee: Yinling Leung, Hong Kong (CN)

( * ) Notice: Subject to any disclaimer, the term of this patent is extended or adjusted under 35 U.S.C. 154(b) by 571 days.

(21) Appl. No.: 17/680,262

(22) Filed: Feb. 24, 2022

(65) Prior Publication Data

US 2022/0179165 A1 Jun. 9, 2022

Related U.S. Application Data

(63) Continuation of application No. PCT/CN2021/074317, filed on Jan. 29, 2021.

(30) Foreign Application Priority Data

Feb. 14, 2020 (CN) .......................... 202010093868.6

(51) Int. Cl.
*G02B 7/02* (2021.01)
*G02B 7/14* (2021.01)

(52) U.S. Cl.
CPC ............... *G02B 7/026* (2013.01); *G02B 7/14* (2013.01)

(58) Field of Classification Search
CPC .......... G02B 7/026; G02B 7/14; G02B 5/005; G03B 11/00; G03B 17/566; G03B 17/14;

(Continued)

(56) References Cited

U.S. PATENT DOCUMENTS 4,018,527 A * 4/1977 Bartel ..................... F21V 11/10
355/71
6,102,554 A * 8/2000 Wynne Willson ...... F21V 11/10
362/323

(Continued)

FOREIGN PATENT DOCUMENTS

CN 2742463 Y * 11/2005
CN 105223672 A 1/2016

(Continued)

OTHER PUBLICATIONS

Machine Translation of CN2742463Y (Year: 2005).*

(Continued)

*Primary Examiner* — Darryl J Collins
*Assistant Examiner* — Matthew Y Lee

(57) ABSTRACT

An adapter includes a hollow adapter body, a rotating ring connected to a second side of the adapter body, and at least three sliding connecting pieces. The rotating ring includes at least two rotating ring guide grooves corresponding to each sliding connecting piece. The adapter body includes at least two adapter body guide grooves corresponding to each sliding connecting piece. Each sliding connecting piece includes a connecting portion. When each sliding connecting piece moves along the corresponding at least two rotating ring guide grooves and the corresponding at least two adapter body guide grooves, configuration of the rotating ring guide grooves and the adapter body guide grooves make connecting portions move away from or close to the rotating ring in a direction perpendicular to the axial direction of the rotating ring and form a circumferential distribution, so as to match and connect with camera lenses having different apertures.

11 Claims, 14 Drawing Sheets

(58) Field of Classification Search
CPC ... G03B 9/06; G03B 9/02; G03B 9/22; G03B 9/08; G03B 9/18; G03B 9/10; G03B 9/24; G03B 9/26; G03B 9/04; G03B 9/07; G03B 9/54; G03B 9/52; G03B 9/46; G03B 9/48; G03B 9/50; G03B 9/36; G03B 9/38; G03B 9/40; G03B 9/44; G03B 9/42; G03B 9/12; G03B 9/14; G03B 9/16; G03B 9/20; G03B 9/00
See application file for complete search history.

(56) References Cited

U.S. PATENT DOCUMENTS

2013/0279897 A1\* 10/2013 Ichikawa ............... G02B 27/00
 396/510
2018/0074387 A1\* 3/2018 Yoshizawa ............... G03B 9/06

FOREIGN PATENT DOCUMENTS

| CN | 110119015 A | 8/2019 |
| CN | 111352286 A | 6/2020 |
| JP | 2015169750 A | 9/2015 |

OTHER PUBLICATIONS

International Search Report issued in corresponding International application No. PCT/CN2021/074317, mailed Apr. 16, 2021.
Written Opinion of the International Searching Authority for No. PCT/CN2021/074317.

\* cited by examiner

ADAPTER

TECHNICAL FIELD

The present disclosure relates to a field of photographic equipment, in particular to an adapter configured to attach a photographic accessory to a front end of camera lenses having different circular apertures.

BACKGROUND

Filters are commonly used photographic accessories in photography and videography. A filter is fixed on a front of a camera lens and is configured to increase color concentration, such as to deepen sky blue, highlight color and lines of white clouds, and eliminate reflected light from non-metallic surfaces such as glass or water. The filter is also configured to increase a shutter speed to make a picture rich while do not change a tonal balance of the entire picture.

The filter or a filter assembly is connected to the camera lens through a bracket. The bracket is connected to the camera lens through an adapter. The filter or the filter assembly is also able to be directly attached to the camera lens via the adapter. Commonly, when a size of the filter does not match a size of the circular aperture at a front end of the camera lens, a circular filter is directly mounted on the camera lens through an adapter ring and a square filter is mounted on the camera lens through a square filter bracket and the adapter ring. The most common used adapter is the adapter ring. Camera lenses having different brands and different focal lengths have different front-end apertures. A lens of one specific size needs to be mounted with a circular filter of a same size or an adapter ring of a same size. For different sizes of lenses, photographers need to use different sizes of adapter rings or different sizes of circular filters. Therefore, photographers usually buy multiple adapter rings of different sizes or circular filters of different sizes to match the camera lenses having different sizes, which undoubtedly increases cost.

In addition, when the photographer goes out to shoot, in order to match camera lenses of different sizes, he needs to carry multiple adapter rings of different sizes or circular filters of different sizes. When replacing the camera lens, the photographer need to replace the corresponding adapter ring or the circular filter, which is very inconvenient for shooting. Moreover, the conventional adapter ring or circular filter is a complete circular structure, which is connected with the camera lens through threads. The conventional adapter ring or circular filter is generally mounted behind the camera lens, and it is difficult to remove the adapter ring from the camera lens due to thermal expansion and contraction or tolerance problems. Thus, it is often stuck in the camera lens, which is a serious defect that often occurs. If the photographer needs to replace the adapter ring and the adapter ring is just stuck on the camera lens, the photographer is easy to miss the best opportunity to shoot.

In summary, the conventional adapter ring has the following disadvantages: easy to get stuck on the camera lens, high replacement cost, poor versatility, and inconvenient to carry.

SUMMARY

The present disclosure provides an adapter to overcome at least one of above-mentioned defects in the prior art. The present disclosure has a simple structure, is convenient to use, is low in cost, has good versatility, and can be applied to a variety of camera lenses having different sizes of front-end circular aperture. Sliding connecting pieces are freely retracted and moved, which solve a problem that an adapter ring or a circular filter is easily got stuck on the camera lens.

In order to solve the above mentioned problems, the present disclosure provides an adapter. The adapter comprises an adapter body, a rotating ring, and at least three sliding connecting pieces.

The adapter body is hollow. An interface matched and connected with a photographic accessory is arranged on a first side of the adapter body. The rotating ring is rotatably connected to a second side of the adapter body.

The rotating ring comprises rotating ring guide grooves. Each sliding connecting piece is corresponding to at least two rotating ring guide grooves. The adapter body comprises adapter body guide grooves. Each sliding connecting piece is corresponding to at least two adapter body guide grooves. Each rotating ring guide groove is corresponding to each adapter body guide grooves. Each sliding connecting piece is fixedly connected to corresponding at least two guide elements. Each of the guide elements passes through a corresponding rotating ring guide groove to slidably connect to a corresponding adapter body guide groove. Each sliding connecting piece is slidably connected to corresponding at least two rotating ring guide grooves and corresponding at least two adapter body guide grooves by corresponding at least two guide elements passing through the corresponding at least two rotating ring guide grooves, so each sliding connecting piece moves along the corresponding at least two rotating ring guide grooves and the corresponding at least two adapter body guide grooves when the rotating ring rotates with respect to the adapter body.

The at least two guide elements corresponding to each sliding connecting piece are in one-to-one correspondence with the at least two rotating ring guide grooves corresponding to each sliding connecting piece and are in one-to-one correspondence with the at least two adapter body guide grooves.

Each sliding connecting piece comprises a connecting portion. When each sliding connecting piece moves along the corresponding at least two rotating ring guide grooves and the corresponding at least two adapter body guide grooves, configuration of the corresponding at least two rotating ring guide grooves and configuration of the corresponding at least two adapter body guide grooves of each sliding connecting piece make the connecting portions of the at least three sliding connecting pieces to form a circumferential distribution. A diameter of the circumferential distribution formed by the connecting portions increases or reduces along with movement of the connecting portions to fit a camera lens.

By adopting the above technical solution, the adapter is able to connect with camera lenses having different sizes of a front-end aperture. Through rotation of the rotating ring with respect to the adapter body, each sliding connecting piece is movable along the corresponding at least two rotating ring guide grooves and the corresponding at least two adapter body guide grooves and each of the connecting portions forms the circumferential distribution. Through the rotation of the rotating ring with respect to the adapter body, the connecting portions form a circumferential distribution with a variable radius.

Specifically, when each sliding connecting piece moves along the corresponding at least two rotating ring guide grooves and the corresponding at least two adapter body guide grooves, the connecting portions of the at least three sliding connecting pieces move away from or close to the rotating ring and forms the circumferential distribution along a direction perpendicular to an axial direction of the rotating ring to match the camera lens. When the connecting portions are close to the rotating ring, a radius of the circumferential distribution of the connecting portions is large and when the connecting portions are away from the rotating ring, the radius of the circumferential distribution of the connecting portions is small. Therefore, in order to match with a camera lens with a certain aperture, the rotating ring is rotated with respect to the adapter body to adjust a position of each of the connecting portions and the radius of the circumferential distribution formed by the connecting portions to match with the aperture of the camera lens to connect with the camera lens. For camera lenses having different apertures, the position of each of the connecting portions and the radius of the circumferential distribution formed by the connecting portions are adjusted accordingly according to the above method, so that the adapter of the present disclosure is connected with the camera lens.

In one embodiment, the at least two rotating ring guide grooves corresponding to each sliding connecting piece comprise a first rotating ring guide groove and a second rotating ring guide groove. The first rotating ring guide grooves form a circumferential distribution along the rotating ring and the second rotating ring guide grooves form a circumferential distribution along the rotating ring. The at least two guide elements corresponding to each sliding connecting piece comprise a first guide element and a second guide element. The at least two adapter body guide grooves corresponding to each sliding connecting piece comprise a first adapter body guide groove and a second adapter body guide groove. The first adapter body guide grooves form a circumferential distribution along the adapter body and the second adapter body guide grooves form a circumferential distribution along the adapter body. Each of the first guide elements passes through a corresponding first rotating ring guide groove. A first end of each of the first guide elements is connected with a corresponding sliding connecting piece. A second end of each of the first guide elements is slidably connected with a first adapter body guide groove. Each of the second guide elements passes through a corresponding second rotating ring guide groove. A first end of each of the second guide elements is connected with a corresponding sliding connecting piece. A second end of each of the second guide elements is slidably connected with a second adapter body guide groove. An orthographic projection of each of the first rotating ring guide grooves on a plane where the adapter body is located intersects with a corresponding first adapter body guide groove at a position of a corresponding first guide element. An orthographic projection of each of the second rotating ring guide grooves on the plane where the adapter body is located intersects with a corresponding second adapter body guide groove at a position of a corresponding second guide element.

Because each of the first guide elements passes through the corresponding first rotating ring guide groove to slidably connect to the corresponding first adapter body guide groove, and the orthographic projection of each of the first rotating ring guide grooves on the plane where the adapter body is located intersects with the corresponding first adapter body guide groove at the position of the corresponding first guide element. When the rotating ring rotates with respect to the adapter body, each of the first rotating ring guide grooves also moves relative to the corresponding first adapter body guide groove, and an intersection of the orthographic projection of each of the first rotating ring guide grooves on the plane where the adapter body is located and the corresponding first adapter body guide grooves changes accordingly. Therefore, each of the first guide elements moves along the corresponding first rotating ring guide groove and the corresponding first adapter body guide groove.

Similarly, because each of the second guide elements passes through the corresponding second rotating ring guide groove to slidably connect to the corresponding second adapter body guide groove, and the orthographic projection of each of the second rotating ring guide grooves on the plane where the adapter body is located intersects with the corresponding second adapter body guide groove at the position of the corresponding second guide element, when the rotating ring rotates with respect to the adapter body, each of the second rotating ring guide grooves also moves relative to the corresponding second adapter body guide groove, and an intersection of the orthographic projection of each of the second rotating ring guide grooves on the plane where the adapter body is located and the corresponding second adapter body guide grooves changes accordingly. Therefore, each of the second guide elements moves along the corresponding second rotating ring guide groove and the corresponding second adapter body guide groove.

In one optional embodiment, a first end of each of the first rotating ring guide grooves is spaced apart from a first end of each of the second rotating ring guide grooves. The first end of each of the first rotating ring guide grooves and the first end of each of the second rotating ring guide grooves are separately arranged close to an outer edge of the rotating ring. A second end of each of the first rotating ring guide grooves is spaced apart from a second end of each of the second rotating ring guide grooves. The second end of each of the first rotating ring guide grooves and the second end of each of the second rotating ring guide grooves are separately arranged close to an inner edge of the rotating ring. A first end of each of the first adapter body guide grooves is spaced apart from a first end of each of the second adapter body guide grooves. The first end of each of the first adapter body guide grooves and the first end of each of the second adapter body guide grooves are separately arranged close to the outer edge of the rotating ring. A second end of each of the first adapter body guide grooves is spaced apart from a second end of each of the second adapter body guide grooves. The second end of each of the first adapter body guide grooves and the second end of each of the second adapter body guide grooves are separately arranged close to the inner edge of the rotating ring.

The first end of each of the first rotating ring guide grooves and the first end of each of the second rotating ring guide grooves are separately arranged close to the outer edge of the rotating ring, and the second end of each of the first rotating ring guide grooves and the second end of each of the second rotating ring guide grooves are separately arranged close to the inner edge of the rotating ring, so under a condition that an inner diameter of the rotating ring and an outer diameter of the rotating ring are fixed, each of the first rotating ring guide grooves and each of the second rotating ring guide grooves have large lengths.

Similarly, the first end of each of the first adapter body guide grooves and the first end of each of the second adapter body guide grooves are spaced apart and are separately arranged close to the outer edge of the adapter body, so under the condition that the inner diameter of the adapter body and the outer diameter of the adapter body are fixed, each of the first adapter body guide grooves and each of the second adapter body guide grooves have large lengths. Thus, each of the first guide elements and each of the second guide elements have a large moving range, which increase an adjusting range of the radius of the circumferential distribution formed by the connecting portions.

In one embodiment, the first side of the adapter body is provided with a first annular groove matched and connected with the photographic accessory. The first annular groove forms the interface.

Specifically, inner threads are arranged on a side wall of the first annular groove, so that the photographic accessory such as a filters, a filter holders or a filter assembly can be screwed into and fixed to the first annular groove through the inner threads. Alternatively, the interface is connected to the photographic accessory by means of magnetic attraction.

Specifically, the connecting portions are protruding portions arranged on the at least three sliding connecting pieces. Each of the protruding portions protrudes away from the adapter body in an axial direction of the adapter body. The protruding portions are configured to fit and connect to the camera lens.

The connecting portions are the protruding portions axially extending in a direction away from the adapter body, and the protruding portion is configured to fit and connect with the camera lens. Specifically, the protruding portions can be engaged with or screwed with the camera lens, so that the connecting portions are fixed to the camera lens.

In one embodiment, the protruding portions are arc plates axially extending in the axial direction of the adapter body away from the adapter body. The arc plates form a circumferential distribution. The arc plates are screwed with the camera lens.

In one embodiment, a stop piece is arranged on the adapter body. The stop piece is configured to prevent the rotating ring from rotating with respect to the adapter body, so as to stop the connecting portions. Since the rotating ring rotates with respect to the adapter body to drive the connecting portions to rotate, so the adapting portions are stopped by preventing the rotating ring from rotating with respect to the adapter body. When the connecting portions are connected to the camera lens, each of the connecting portions is stopped by the stop piece to further fix the connecting portions to the camera lens, thereby preventing the adapter from separating from the camera lens.

In one embodiment, elastic pieces are arranged in the adapter body, the elastic pieces fastens the sliding connecting pieces. Automatic locking of the sliding connecting pieces is realized by rotating the adapter body. Specifically, the elastic pieces may be springs or elastic sheets. Specifically, the elastic pieces are coil springs, which are arc shaped. Each of the coil springs has a cylindrical first end and a cylindrical second end of the coil spring. The cylindrical first end of each of the coil springs is rotatably connected to the adapter body. The cylindrical second end of each of the coil springs is fixedly connected with the rotating ring. Since the cylindrical first end of each of the coil springs is rotatably connected to the adapter body and the cylindrical second end of each of the coil springs is fixedly connected with the rotating ring, when the rotating ring rotates with respect to the adapter body, the cylindrical second end of each of the coil springs is pulled along with the rotation of the rotating ring. The coil springs are deformed and have an elastic force, so that the connecting portions is locked with respect to the photographic accessory by the elastic force. That is, the automatic locking of the sliding connecting pieces is realized.

In one embodiment, a second annular groove is provided on the second side of the adapter body. The rotating ring is embedded in the second annular groove to rotatably connect to the adapter body. A threaded through hole communicated with the second annular groove is on a circumferential side wall of the adapter body. The stop piece is a screw screwed with the threaded through hole. The screw passes through the threaded through hole and moves along the threaded through hole to abut against or away from the rotating ring.

When the connecting portions need to be stopped, the screw is prevented from moving by screwing the screw into the threaded through hole to but against the rotating ring. When the connecting portions need to be moved, the screw is screwed out of the threaded through hole to be separated from the rotating ring and the screw does not hinder the movement of the connecting portions, which is very simple to operate.

In one embodiment, each sliding connecting piece comprises a sheet-shaped body forming a sector ring. Each sheet-shaped body comprises a first mounting hole and a second mounting hole. Each of the connecting portions is arranged on an upper side of a corresponding sheet-shaped body. A first end of each of the first guide elements is threadedly connected with a corresponding first mounting hole. Each sheet-shaped body is separately slidably connected with a corresponding first rotating ring guide groove and a corresponding first adapter body guide groove through a corresponding first guide element. A second end of each of the second guide elements is threadedly connected with a corresponding second mounting hole. Each sheet-shaped body is separately slidably connected with a corresponding second rotating ring guide groove and a corresponding second adapter body guide groove through a corresponding second guide element.

When using the adapter, for the camera lens with a small aperture, especially the camera lens with an aperture less than an inner diameter of the rotating ring, it is necessary to move each sheet-shape body close to a center of the rotating ring, so that each of the connecting portions moves to a corresponding hollow position of the rotating ring. At this time, there are gaps between the sheet-shaped bodies, which is prone to light interference, resulting in light leakage and affecting shooting effect. In order to solve the possible light leakage problem and improve the shooting effect, in one embodiment, each sheet-shaped body comprises a first end of each sheet-shaped body and a second end of each sheet-shaped body. A first light blocking portion is arranged on the first end of each sheet-shaped body. A second light blocking portion is arranged on the second end of each sheet-shaped body.

The first light blocking portion and the second light blocking portion block the gaps between the sheet-shaped bodies to prevent light leakage.

In addition, when the sheet-shaped bodies moves close to the center of the rotating ring, in order to prevent the first light blocking portion and the second light blocking portion from colliding and hindering movements of the sheet-shaped bodies, both of a thickness of each first light blocking portion and a thickness of each second light blocking portion are less than a thickness of the sheet-shaped body. Each first light blocking portion and each second light blocking portion are sheet-shaped structures. When adjacent sheet-shaped bodies are moved to close to each other, each first light blocking portion overlaps a corresponding second light blocking portion.

Compared with the prior art, the adapter of the present disclosure is matched and connected to camera lenses having different apertures. Through rotation of the rotating ring with respect to the adapter body, each sliding connecting piece is movable along the corresponding at least two rotating ring guide grooves and the corresponding at least two adapter body guide grooves.

The connecting portions of the at least three sliding connecting pieces move away from or close to the rotating ring and forms the circumferential distribution along the direction perpendicular to the axial direction of the rotating ring to match the camera lens. Meanwhile, the connecting portions form the circumferential distribution. That is, through the rotation of the rotating ring with respect to the adapter body, the connecting portions form the circumferential distribution with the variable radius. By adjusting the position of each of the connecting portions and the radius of the circumferential distribution formed by the connecting portions, the adapter is matched and connected to camera lenses having different apertures. The adapter of the present disclosure has a simple structure, is convenient to use, is low in cost, and has good versatility.

DETAILED DESCRIPTION

Figure 1:
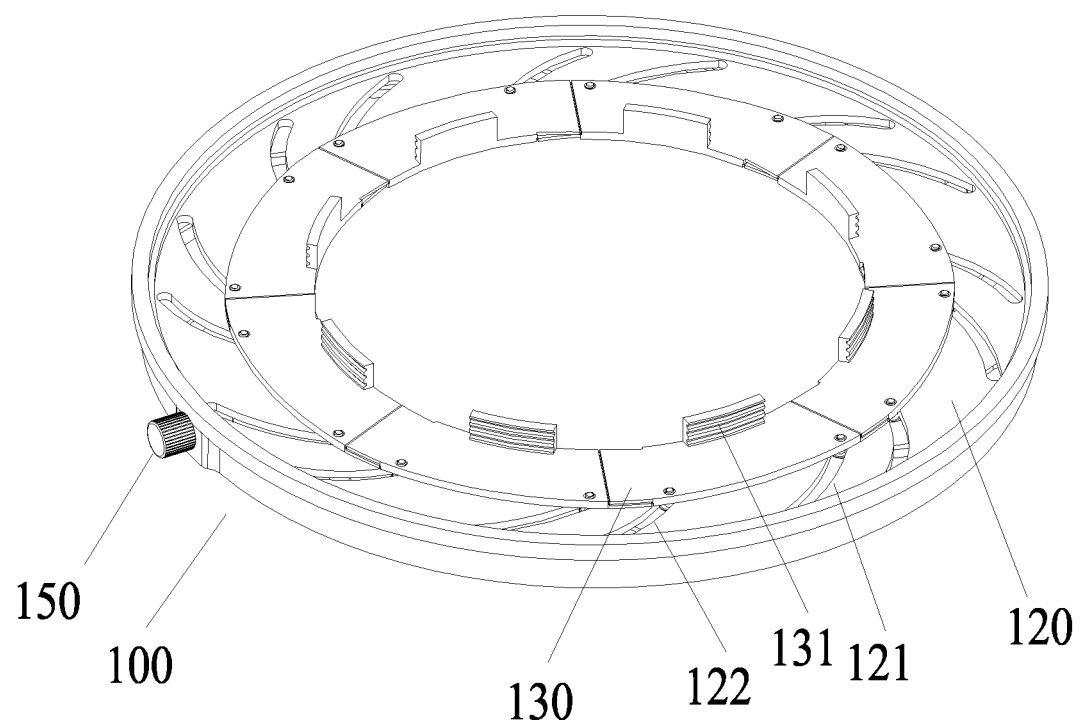
FIG. 1 is a schematic diagram of an adapter of a first embodiment of the present disclosure.

The accompanying drawings are for illustrative purposes only, and should not be construed as limitations of the present disclosure. In order to well illustrate the present embodiments, some parts of the accompanying drawings may be omitted, enlarged or reduced, and the accompanying drawings do not represent a size of the actual product. For those skilled in the art, certain well-known structures and their omitted descriptions in the accompanying drawings are understood. The positional relationships described in the drawings are only for exemplary illustration, and should not be construed as limitations of the present disclosure.

Embodiment 1

The present disclosure provides an adapter to overcome at least one of above-mentioned defects in the prior art. The present disclosure has a simple structure, is convenient to use, is low in cost, has good versatility, and can be applied to a variety of camera lenses having different sizes of front-end circular aperture. Sliding connecting pieces are freely retracted and moved, which solves a problem that an adapter ring or a circular filter is easily got stuck on the camera lens.

In order to solve the above-mentioned problems, the present disclosure provides an adapter. As shown in FIGS. 1-4 and 13-15, the adapter 100 comprises an adapter body 110, a rotating ring 120, and eight sliding connecting pieces 130.

The adapter body 110 is hollow. An interface matched and connected with a photographic accessory is arranged on a first side of the adapter body 110. The rotating ring 120 is rotatably connected to a second side 110b of the adapter body 110.

The rotating ring comprises first rotating ring guide grooves 121 separately corresponding to a corresponding sliding connecting piece and second rotating ring guide grooves 122 separately corresponding to a corresponding sliding connecting piece. The adapter body 110 comprises first adapter body guide grooves 111 separately corresponding to a corresponding sliding connecting piece and second adapter body guide groove 112 separately corresponding to a corresponding sliding connecting piece. Each of the first rotating ring guide grooves 121 corresponds to a corresponding second rotating ring guide groove 122.

Each sliding connecting piece is fixedly connected to a first guide element 141 and a second guide element 142. Each of the first guide elements 141 passes through a corresponding first rotating ring guide groove 121 to slidably connect to a corresponding first adapter body guide groove 111. Each of the second guide elements 142 passes through a corresponding second rotating ring guide groove 122 to slidably connect to a corresponding second adapter body guide groove 112.

Each sliding connecting piece 130 is slidably connected to a corresponding first rotating ring guide groove 121, a corresponding second rotating ring guide groove 122, a corresponding first adapter body guide groove 111, and a corresponding second adapter body guide groove 112 by a corresponding first guide element 141 passing through the corresponding first rotating ring guide groove 121 and a corresponding second guide element 142 passing through the corresponding second rotating ring guide groove 122, so each sliding connecting piece moves along the corresponding first rotating ring guide groove 121, the corresponding second rotating ring guide groove 122, the corresponding first adapter body guide groove 111, and the corresponding second adapter body guide groove 112 when the rotating ring 120 rotates with respect to the adapter body 110. Each of the first guide elements 141 corresponds to each of the first rotating ring guide grooves 121 and each of the first adapter body guide grooves 111. The second guide element 142 corresponds to the second rotating ring guide groove 122 and the second adapter body guide groove 112.

Each sliding connecting piece 130 comprises a connecting portion 131. When each sliding connecting piece 131 moves along the corresponding first rotating ring guide groove 121, the corresponding second rotating ring guide groove 122, the corresponding first adapter body guide groove 111, and the corresponding second adapter guide groove 112, configurations of the corresponding first rotating ring guide groove 121, the corresponding second rotating ring guide groove 122, the corresponding first adapter body guide groove 111, and the corresponding second adapter guide groove 112 of each sliding connecting piece 130 make the connecting portions 131 of the sliding connecting pieces to move close or away from the rotating ring 120 to form a circumferential distribution along a direction perpendicular to an axial direction of the rotating ring 120 to fit a camera lens.

In the embodiment, when the sliding connecting pieces 130 move along the first rotating ring guide grooves 121, the second rotating ring guide grooves 122, the first adapter body guide grooves 111, and the second adapter body guide grooves 112, the connecting portions 131 of the sliding connecting pieces 130 are away from or close to the rotary ring 120 along a curve on a plane perpendicular to the axial direction of the rotary ring 120 and form the circumferential distribution.

By adopting the above technical solution, the adapter 100 is able to connect with camera lenses having different apertures. Through rotation of the rotating ring with respect to the adapter body, each sliding connecting piece is movable along the corresponding first rotating ring guide groove 121, the corresponding second rotating ring guide groove 122, the corresponding first adapter body guide groove 111, and the corresponding second adapter guide groove 112. Meanwhile, the connecting portions 131 of the sliding connecting pieces 130 move away from or close to the rotary ring 120 along the direction perpendicular to the axial direction of the rotary ring 120 and form the circumferential distribution. That is, through the rotation of the rotating ring 120 with respect to the adapter body 110, the connecting portions 131 form the circumferential distribution with a variable radius. When the connecting portions 131 move close to the rotating ring 120, a radius of the circumferential distribution formed by the connecting portions 131 become large. When the connecting portions 131 move away from the rotating ring 120, the radius of the circumferential distribution formed by the connecting portions 131 become small. Therefore, in order to match with a camera lens with a certain aperture, the rotating ring 120 is rotated with respect to the adapter body 110 to adjust a position of each of the connecting portions 131 and the radius of the circumferential distribution formed by the connecting portions 131 to match with the aperture of the camera lens to connect with the camera lens. For camera lenses having different apertures, the position of each of the connecting portions 131 and the radius of the circumferential distribution formed by the connecting portions 131 are adjusted accordingly according to the above method, so that the adapter of the present disclosure is connected with the camera lens.

As shown in FIGS. 3 and 9-15, the first rotating ring guide grooves 121 form a circumferential distribution along the rotating ring 120 and the second rotating ring guide grooves 122 form a circumferential distribution along the rotating ring 120. The first adapter body guide grooves 111 form a circumferential distribution along the adapter body 110 and the second adapter body guide grooves 112 form a circumferential distribution along the adapter body 110. Each of the first guide elements 141 passes through a corresponding first rotating ring guide groove 121. A first end of each of the first guide elements 141a is connected with a corresponding sliding connecting piece 130. A second end of each of the first guide elements 141b is slidably connected with a corresponding first adapter body guide groove 111. Each of the second guide elements 142 passes through a corresponding second rotating ring guide groove 122. A first end of each of the second guide elements 142a is connected with a corresponding sliding connecting piece 130. A second end of each of the second guide elements 142b is slidably connected with a second adapter body guide groove 112. An orthographic projection of each of the first rotating ring guide grooves 121 on a plane where the adapter body 110 is located intersects with a corresponding first adapter body guide groove 111 at a position of a corresponding first guide element 141. An orthographic projection of each of the second rotating ring guide grooves 122 on the plane where the adapter body 110 is located intersects with a corresponding second adapter body guide groove 112 at a position of a corresponding second guide element 142.

In the embodiment, a bottom portion of each of the first rotating ring guide grooves 121 and a bottom portion of each of the second rotating ring guide grooves 122 are hollowed-out, so each of the first guide elements 141 passes through the corresponding first rotating ring guide groove 121 and each of the second guide elements 142 passes through the corresponding second rotating ring guide groove 122.

Because each of the first guide elements 141 passes through the corresponding first rotating ring guide groove 121 to slidably connect to the corresponding first adapter body guide groove 111, and the orthographic projection of each of the first rotating ring guide grooves 111 on the plane where the adapter body 110 is located intersects with the corresponding first adapter body guide groove 111 at the position of the corresponding first guide element 141, when the rotating ring 120 rotates with respect to the adapter body 110, each of the first rotating ring guide grooves 121 also moves relative to the corresponding first adapter body guide groove 111, and an intersection of the orthographic projection of each of the first rotating ring guide grooves 121 on the plane where the adapter body 110 is located and the corresponding first adapter body guide grooves 111 changes accordingly. Therefore, each of the first guide elements 141 moves along the corresponding first rotating ring guide groove 121 and the corresponding first adapter body guide groove 111.

Similarly, because each of the second guide elements 142 passes through the corresponding second rotating ring guide groove 122 to slidably connect to the corresponding second adapter body guide groove 112, and the orthographic projection of each of the second rotating ring guide grooves 122 on the plane where the adapter body 110 is located intersects with the corresponding second adapter body guide groove 112 at the position of the corresponding second guide element 142, when the rotating ring 120 rotates with respect to the adapter body 110, each of the second rotating ring guide grooves 122 also moves relative to the corresponding second adapter body guide groove 112, and an intersection of the orthographic projection of each of the second rotating ring guide grooves 122 on the plane where the adapter body 110 is located and the corresponding second adapter body guide grooves 112 changes accordingly. Therefore, each of the second guide elements 142 moves along the corresponding second rotating ring guide groove 122 and the corresponding second adapter body guide groove 112.

Figure 10:
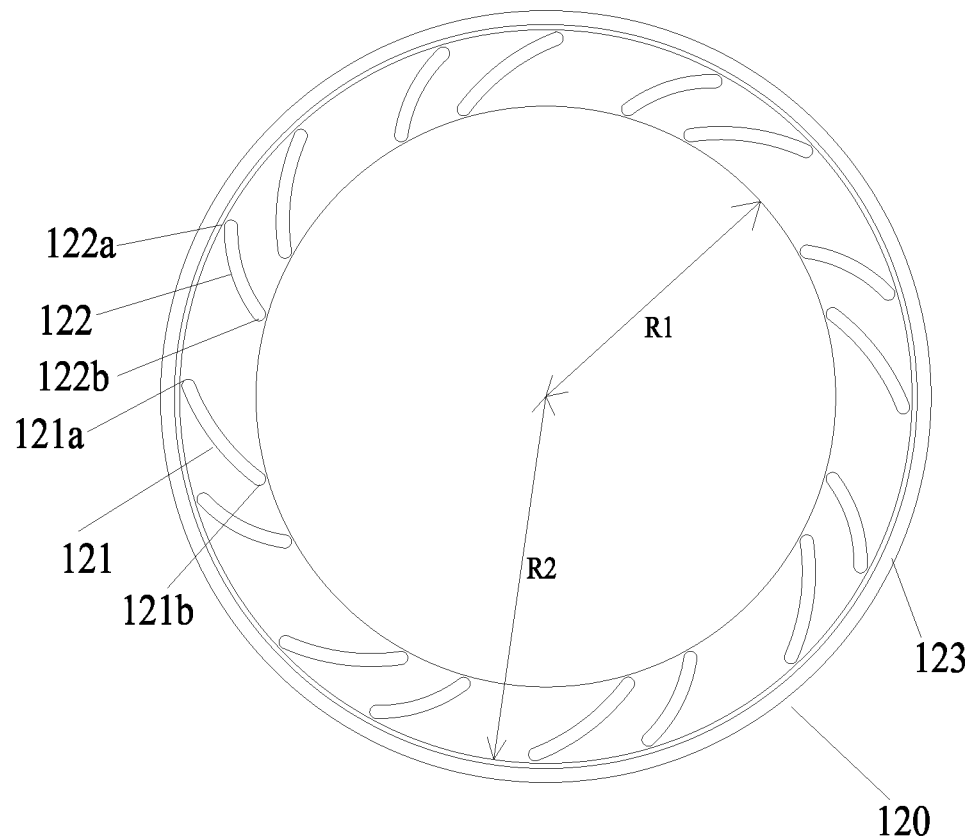
FIG. 10 is a schematic diagram of a rotating ring of the adapter of the first embodiment of the present disclosure.
Figure 11:
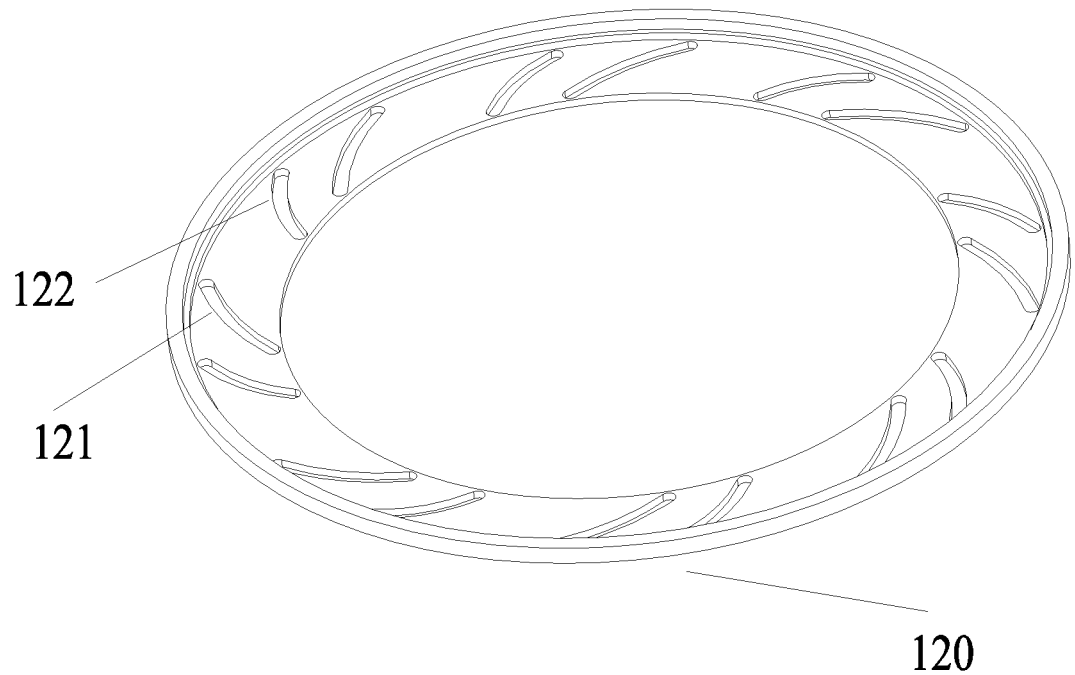
FIG. 11 is a perspective schematic diagram of the rotating ring of the adapter of the first embodiment of the present disclosure.
Figure 12:
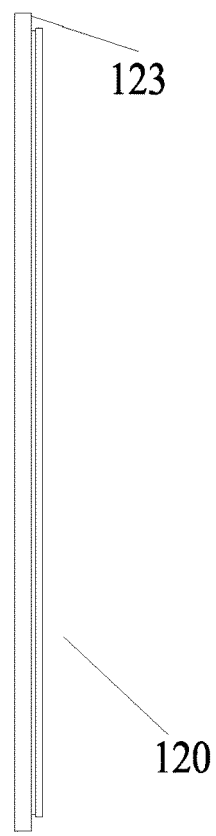
FIG. 12 is a side schematic diagram of the rotating ring of the adapter of the first embodiment of the present disclosure.

A first end of each of the first rotating ring guide grooves 121a is spaced apart from a first end of each of the second rotating ring guide grooves 122a. The first end of each of the first rotating ring guide grooves 121a and the first end of each of the second rotating ring guide grooves 122a are separately arranged close to an outer edge of the rotating ring 120. A second end of each of the first rotating ring guide grooves 121b is spaced apart from a second end of each of the second rotating ring guide grooves 122b. The second end of each of the first rotating ring guide grooves 121b and the second end of each of the second rotating ring guide grooves 122b are separately arranged close to an inner edge of the rotating ring 120. A first end of each of the first adapter body guide grooves 111a is spaced apart from a first end of each of the second adapter body guide grooves 112a. The first end of each of the first adapter body guide grooves 111a and the first end of each of the second adapter body guide grooves 112a are separately arranged close to the outer edge of the rotating ring 120. A second end of each of the first adapter body guide grooves 111b is spaced apart from a second end of each of the second adapter body guide grooves 112b. The second end of each of the first adapter body guide grooves 111b and the second end of each of the second adapter body guide grooves 112b are separately arranged close to the inner edge of the rotating ring. As shown in FIGS. 10 and 12, the outer edge of the adapter body 110 comprises an annular flange 123. As shown in FIG. 10, in the embodiment, an inner radius R1 of the rotating ring 120 is 20 mm. That is, an inner diameter of the rotating ring 120 is 40 mm. An outer radius R2 of the rotating ring 120 is 50.25 mm. That is, an outer diameter of the rotating ring 120 is 105 mm. It is understood that in other embodiments, the inner diameter of the rotating ring 120 can be set to be no more than 40 mm as required, and the outer diameter of the rotating ring 120 can be set to be not less than 105 mm.

Figure 13:
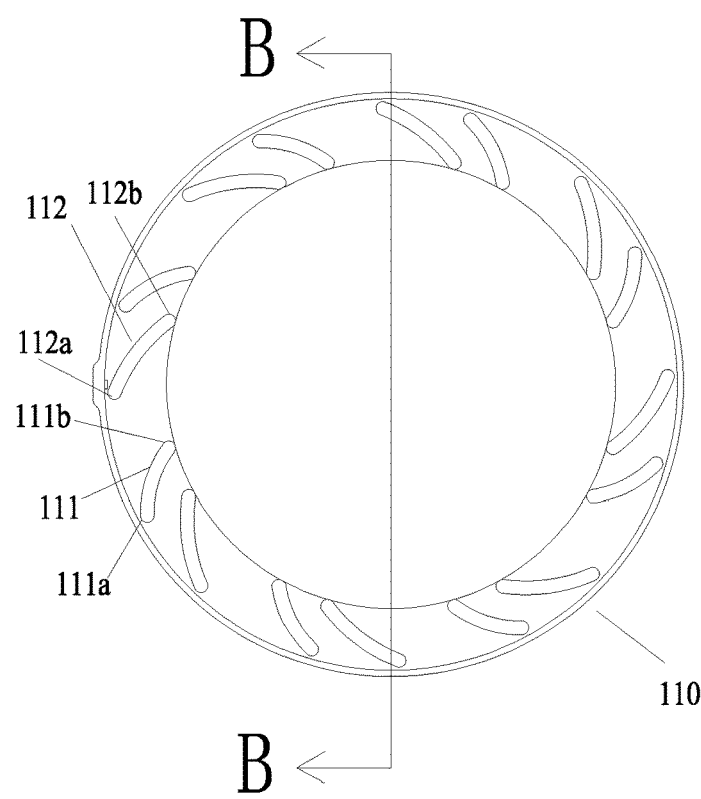
FIG. 13 is a schematic diagram of an adapter body of the adapter of the first embodiment of the present disclosure.
Figure 14:
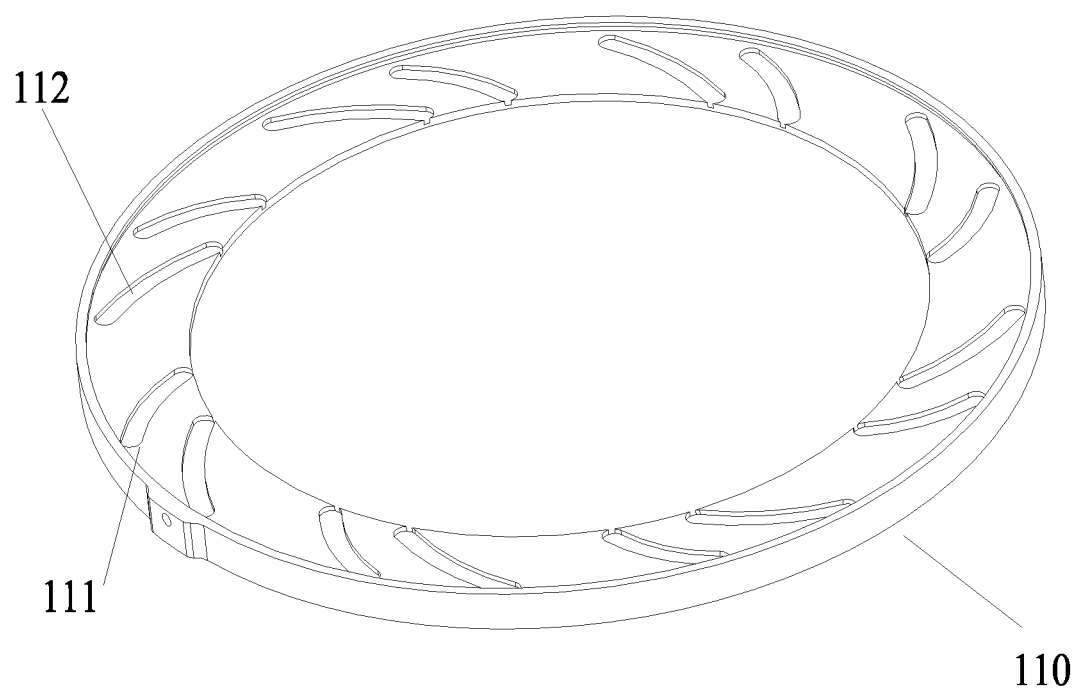
FIG. 14 is a perspective schematic diagram of the adapter body of the adapter of the first embodiment of the present disclosure.
Figure 15:
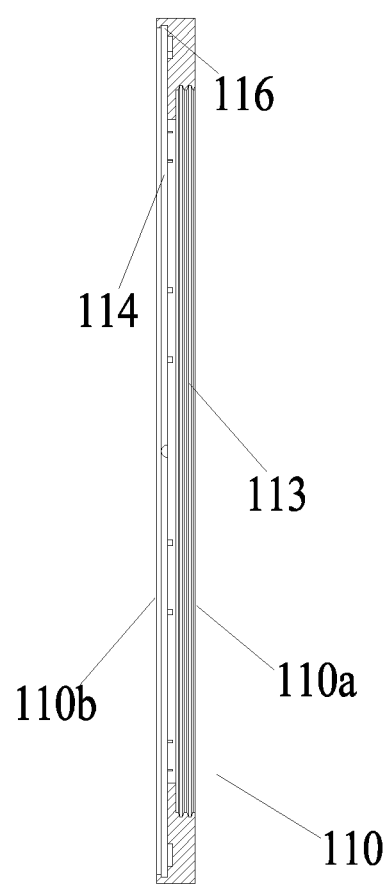
FIG. 15 is a cross-sectional schematic diagram of the adapter body taken along the line B-B shown in FIG. 13.

As shown in FIGS. 13-15, the first side of the adapter body 110a is provided with a first annular groove 113 matched and connected with the photographic accessory. The first annular groove 113 forms the interface.

As shown in FIGS. 1-8, the connecting portions 131 are protruding portions arranged on the sliding connecting pieces 130. Each of the protruding portions protrudes away from the adapter body 110 in an axial direction of the adapter body 110. The protruding portions are arc plates axially extending in the axial direction of the adapter body 110 away from the adapter body 110. The arc plates form a circumferential distribution. The arc plates are screwed with the camera lens. It can be clearly seen from FIG. 8 that a side wall radially outward of the arc plate is provided with external threads, so as to be connected with internal threads of the camera lens.

Figure 2:
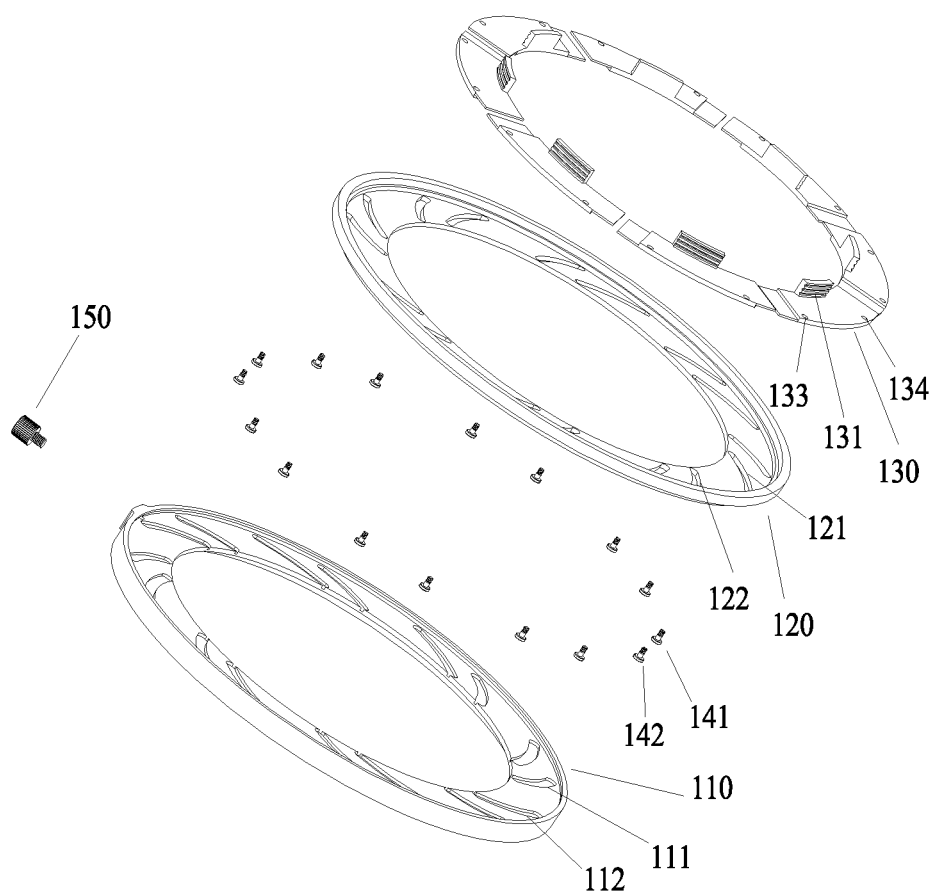
FIG. 2 is an exploded schematic diagram of the adapter of the first embodiment of the present disclosure.
Figure 3:
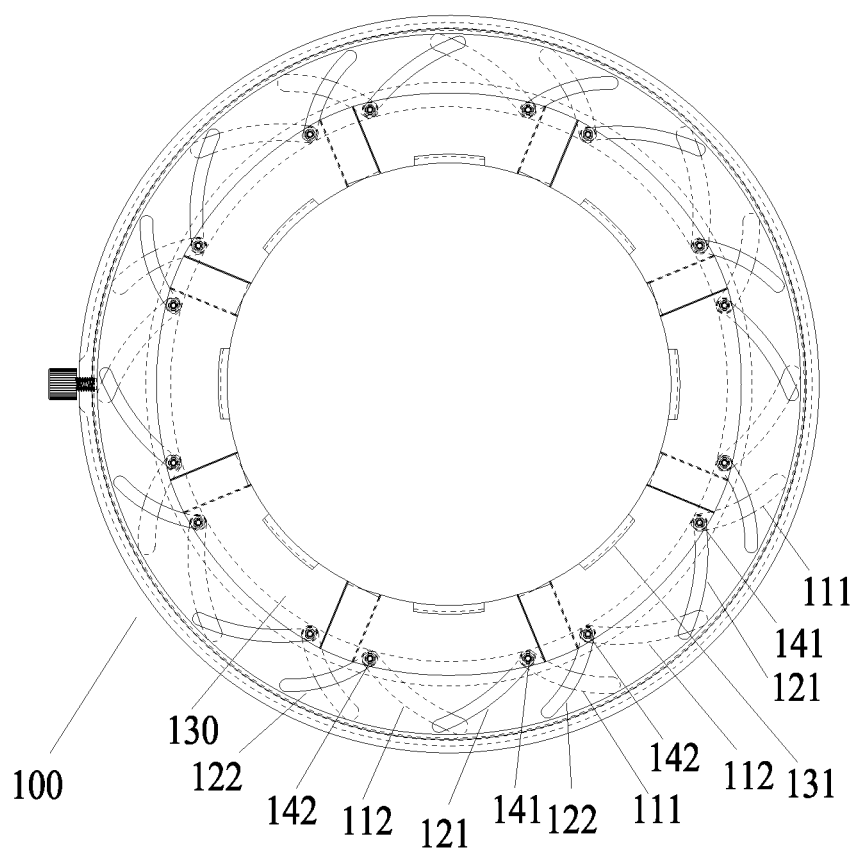
FIG. 3 is another schematic diagram of the adapter of the first embodiment of the present disclosure.
Figure 4:
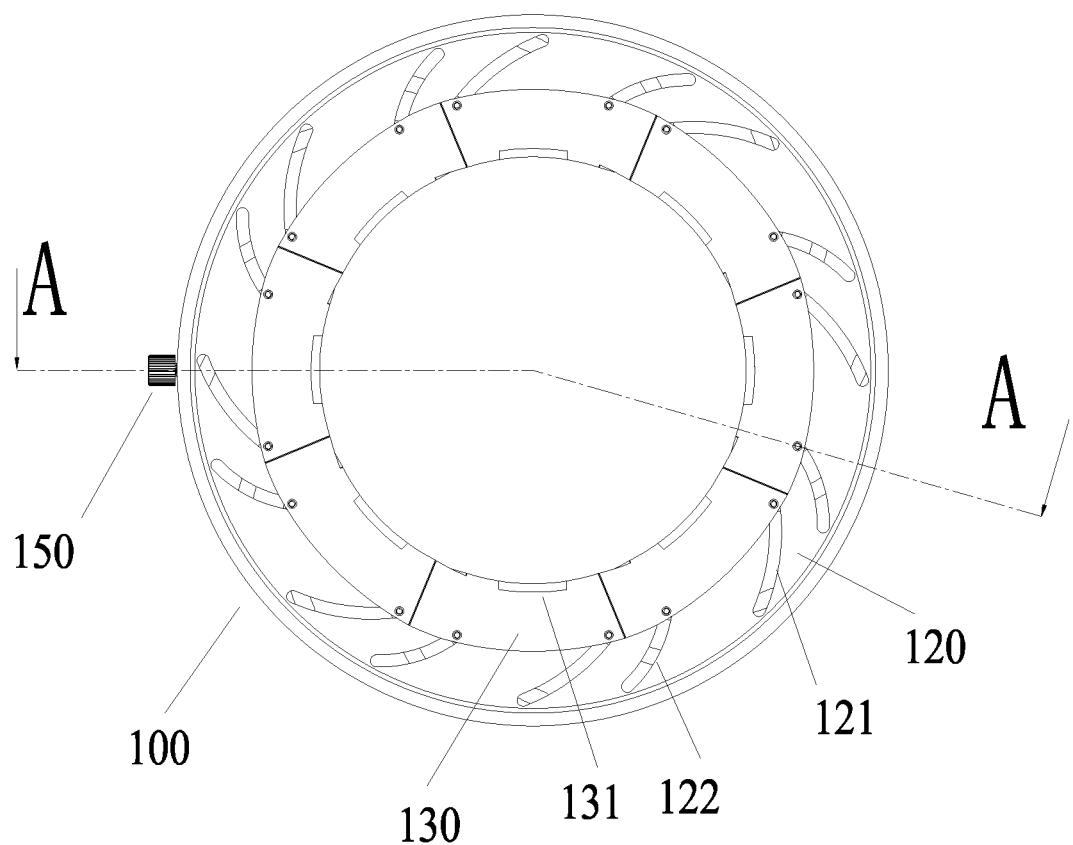
FIG. 4 is another schematic diagram of the adapter of the first embodiment of the present disclosure.
Figure 5:
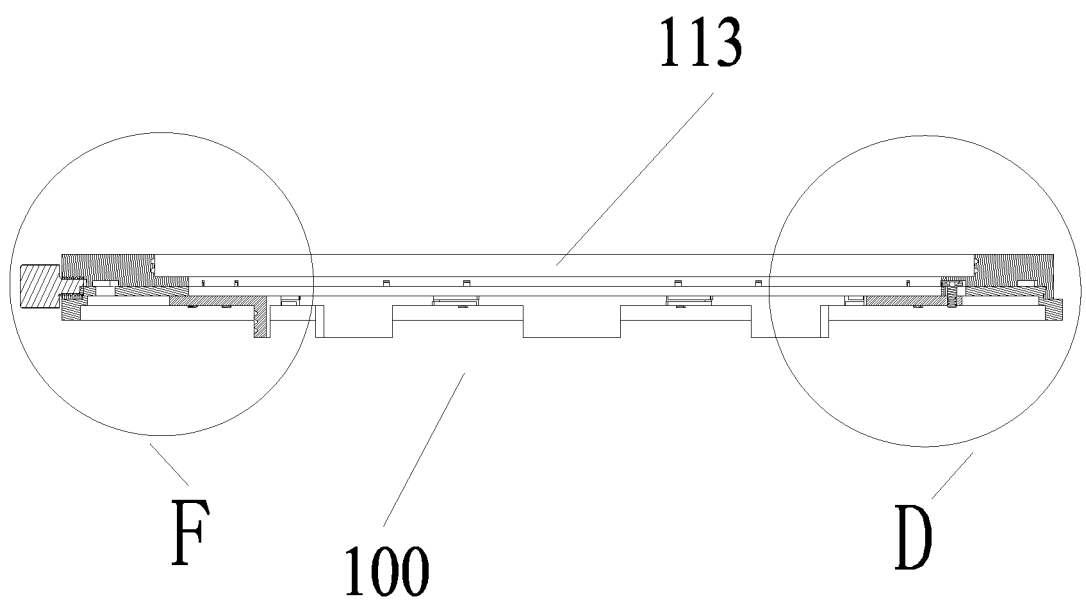
FIG. 5 is a cross-sectional schematic diagram of the adapter taken along the line A-A shown in FIG. 4.
Figure 6:
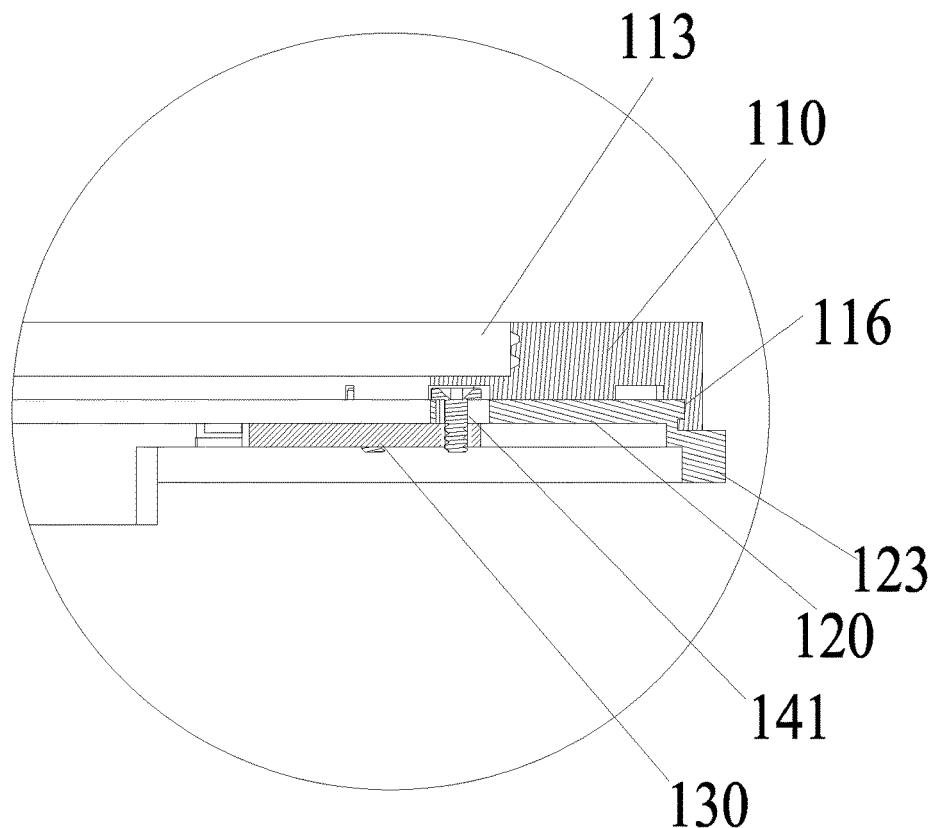
FIG. 6 is an enlarged schematic diagram of the area D shown in FIG. 5.
Figure 7:
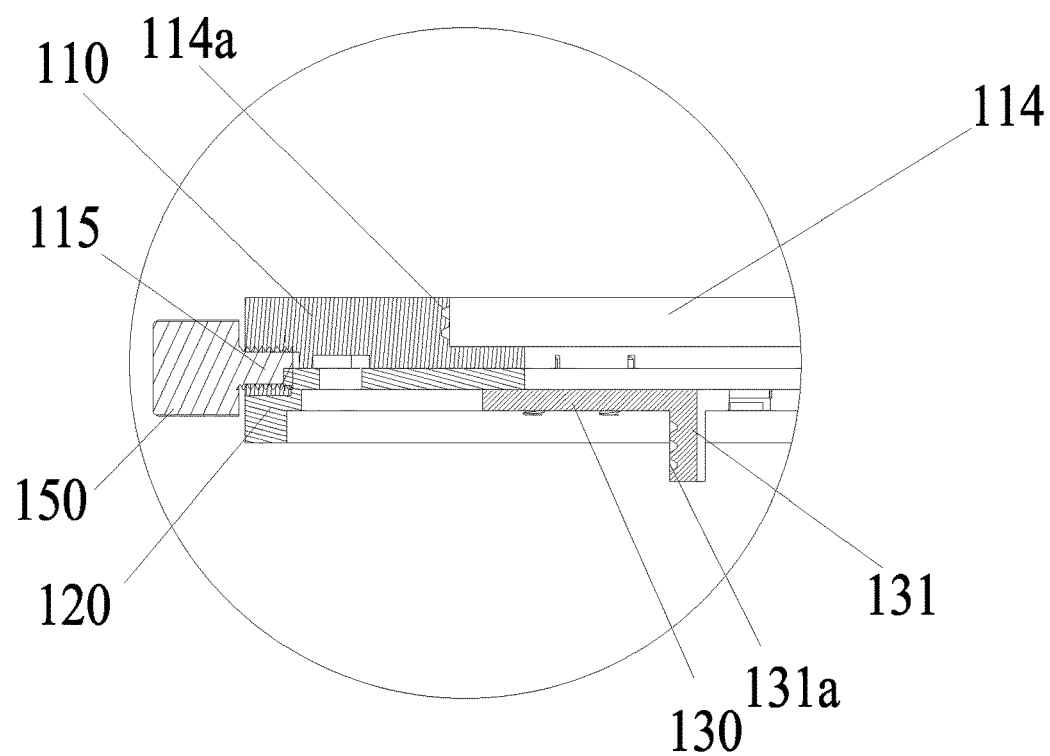
FIG. 7 is an enlarged schematic diagram of the area F shown in FIG. 5.
Figure 8:
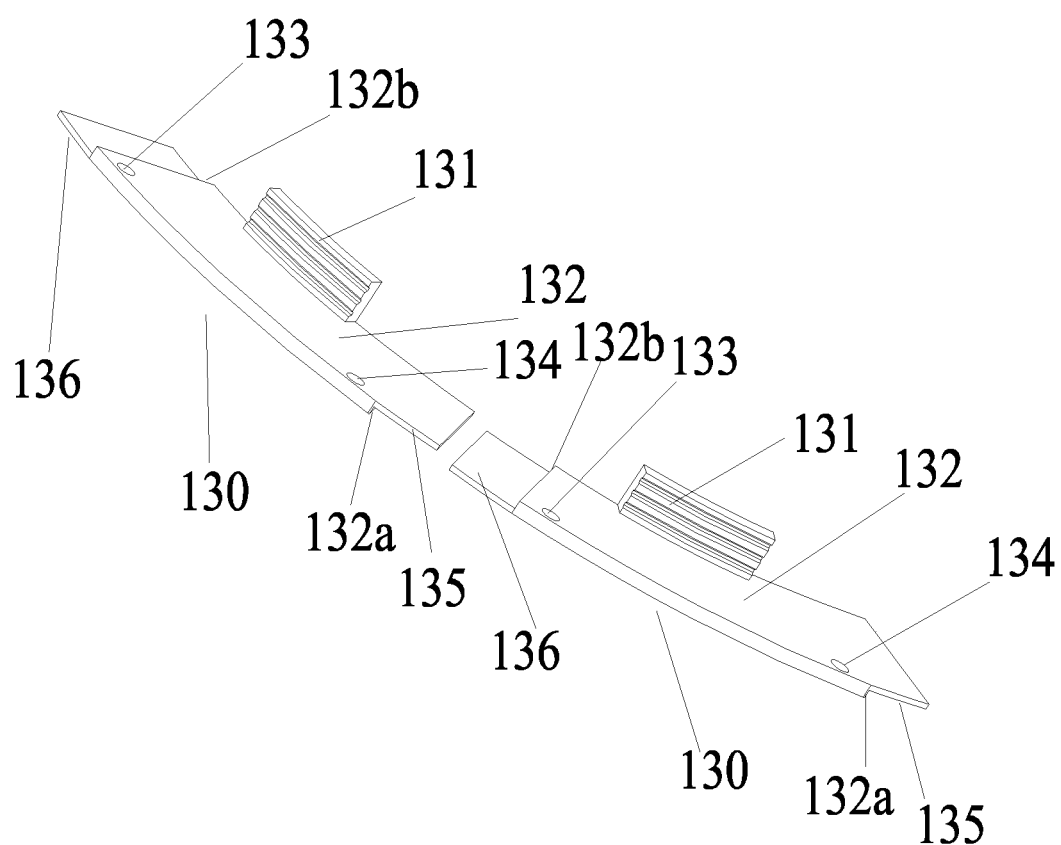
FIG. 8 is a schematic diagram of two adjacent sliding connecting pieces of the adapter of the first embodiment of the present disclosure.
Figure 9:
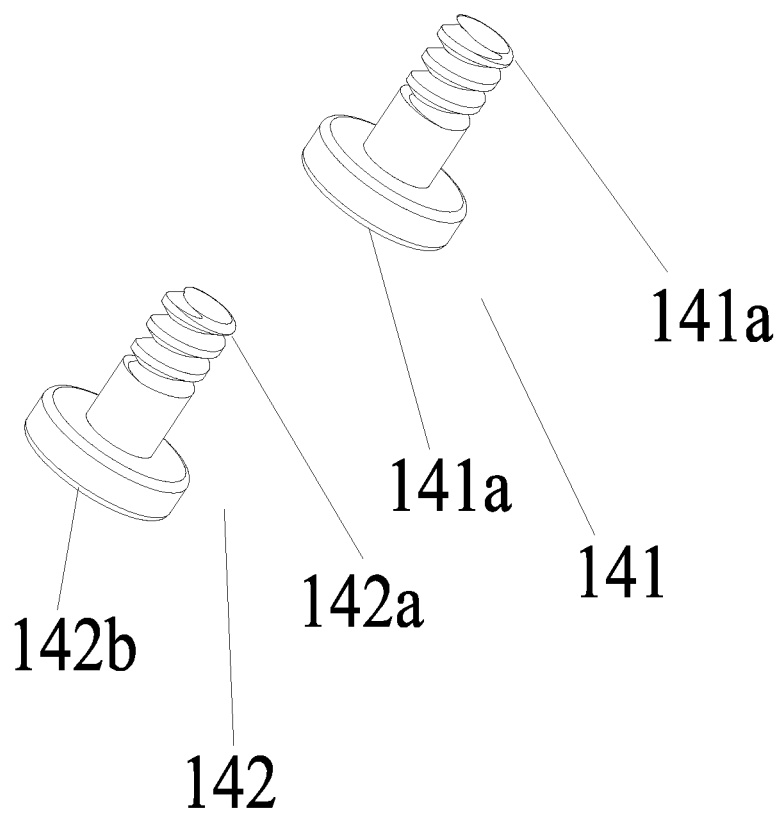
FIG. 9 is a schematic diagram of a first guide element and a second guide element of the adapter of the first embodiment of the present disclosure.

As shown in FIGS. 1-2, and 7, a stop piece 150 is arranged on the adapter body 110. The stop piece 150 is configured to prevent the rotating ring 120 from rotating with respect to the adapter body 110, so as to stop the connecting portions 131. Since the rotating ring 120 rotates with respect to the adapter body 110 to drive the connecting portions 131 to rotate, so the adapting portions 131 are stopped by preventing the rotating ring 120 from rotating with respect to the adapter body 110. When the connecting portions 131 are connected to the camera lens, each of the connecting portions 131 is stopped by the stop piece 150 to further fix the connecting portions 131 to the camera lens, thereby preventing the adapter 100 from separating from the camera lens.

A second annular groove 114 is provided on the second side 110b of the adapter body 110. The rotating ring 120 is embedded in the second annular groove 114 to rotatably connect to the adapter body 110. A threaded through hole 115 communicated with the second annular groove 114 is on a circumferential side wall of the adapter body 110. The stop piece 150 is a screw screwed with the threaded through hole. The screw passes through the threaded through hole 115 and moves along the threaded through hole to abut against or away from the rotating ring 120.

As shown in FIG. 15, a third annular groove 116 is provided on a side wall of the second annular groove 114. The rotating ring 120 comprises a step corresponding to the third annular groove 116. When the rotating ring 120 is embedded in the second annular groove 114, the step is embedded in and engaged with the third annular groove 116, so that the rotating ring 120 and the adapter body 110 are relatively fixed. The relative fixation between the rotating ring 120 and the adapter body 110 only prevents the rotating ring 120 from separating from the adapter body 110, and does not hinder the rotation of the rotating ring 120 with respect to the adapter body 110.

As shown in FIGS. 1-2 and 8-9, each sliding connecting piece comprises a sheet-shaped body 132 forming a sector ring. Each sheet-shaped body 132 comprises a first mounting hole 133 and a second mounting hole 134. Each of the connecting portions 132 is arranged on an upper side of a corresponding sheet-shaped body 132. A first end of each of the first guide elements 141a is threadedly connected with a corresponding first mounting hole 133. Each sheet-shaped body 132 is separately slidably connected with a corresponding first rotating ring guide groove 121 and a corresponding first adapter body guide groove 111 through a corresponding first guide element 141. A second end of each of the second guide elements 142a is threadedly connected with a corresponding second mounting hole 134. Each sheet-shaped body 132 is separately slidably connected with a corresponding second rotating ring guide groove 122 and a corresponding second adapter body guide groove 112 through a corresponding second guide element 142. Each sheet-shaped body 132 comprises a first end of each sheet-shaped body 132a and a second end of each sheet-shaped body 132b. A first light blocking portion 135 is arranged on the first end of each sheet-shaped body 132a. A second light blocking portion 136 is arranged on the second end of each sheet-shaped body 132b. Both of a thickness of each first light blocking portion 135 and a thickness of each second light blocking portion 136 are less than a thickness of the sheet-shaped body. Each first light blocking portion 135 and each second light blocking portion 136 are sheet-shaped structures. When adjacent sheet-shaped bodies 132 are moved to close to each other, each first light blocking portion 135 overlaps a corresponding second light blocking portion 136.

Specifically, each first light blocking portion 135 extends from the first end 132a of each sheet-shaped body to form the sheet-shaped structure that is thinner than each sheet-shaped body. A lower side surface of each first light blocking portion 135 is flush with a lower side surface of a corresponding sheet-shaped body 132, and an upper side surface of each first light blocking portion 135 is lower than upper side surface of the corresponding sheet-shaped body 132. Each second light blocking portion 136 extends from the second end 132b of each sheet-shaped body to form the sheet-shaped structure that is thinner than each sheet-shaped body. An upper side surface of each second light blocking portion 136 is flush with an upper side surface of a corresponding sheet-shaped body 132, and a lower side surface of each second light blocking portion 136 is lower than a lower side surface of the corresponding sheet-shaped body 132. A sum of the thicknesses of each first light blocking portion 135 and each second light blocking portion 136 is no more than the thickness of each sheet-shaped body 132. In the embodiment, a length of each first light blocking portion 135 is configured to be equal to a length of each second light blocking portion 136, so that when the adjacent sliding connecting pieces 130 are closest to each other, each first light blocking part 135 completely overlaps the corresponding second light blocking portion 136, each first light blocking portion 135 is connected to an adjacent sheet-shaped body 132, and each first light blocking portion 136 and the second end of the adjacent sheet-shaped body 132b are connected with the first end of the sheet-shaped body 132a.

Figure 16:
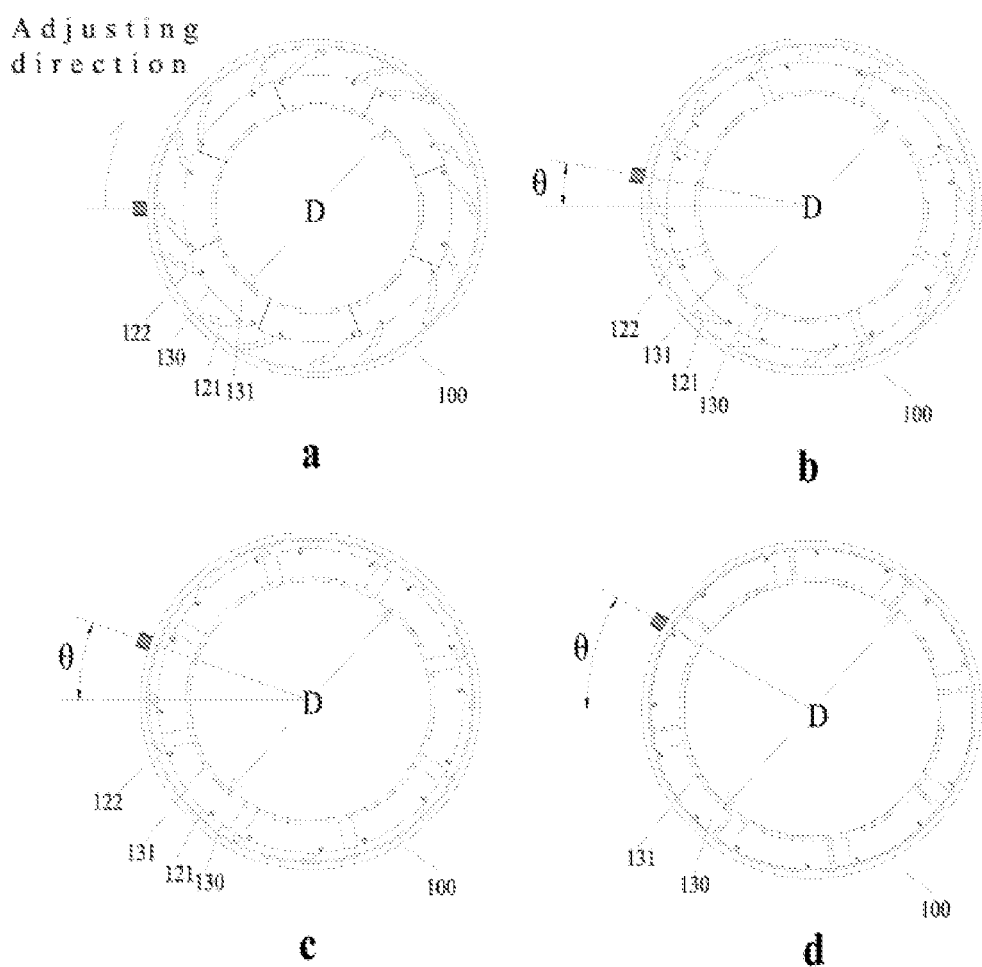
FIG. 16 is a schematic diagram showing changes of a diameter of a circumferential distribution formed by the connecting portions of the adapter body according to the first embodiment of the present disclosure.
Figure 17:
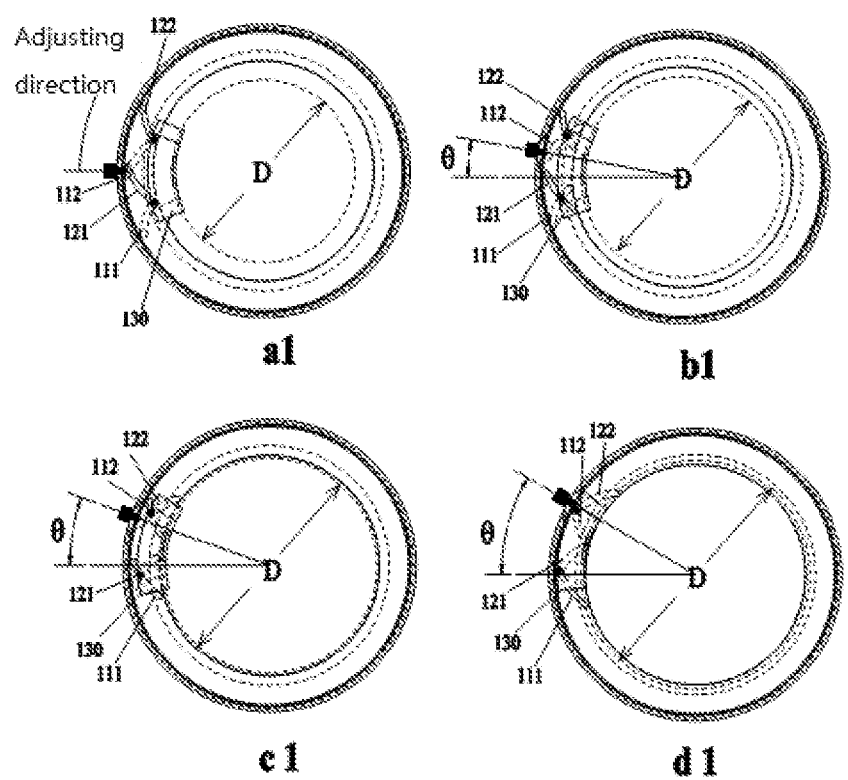
FIG. 17 is a schematic diagram showing changes of motion trajectory of the sliding connecting pieces according to the first embodiment of the present disclosure.

FIG. 16 is a schematic diagram showing changes of a diameter of the circumferential distribution formed by the connecting portions 131 of the adapter according to the first embodiment of the present disclosure. As shown in FIGS. 16 and 17, it is understood that by adjusting a rotation angle θ of the rotating ring 120 with respect to the adapter body 110, the diameter of the circumferential distribution formed by the connecting portions 131 is adjusted.

In the picture a of FIG. 16, the rotation angle θ is 0 degrees, and the diameter D of the circumferential distribution formed by the connecting portions 131 is 40 mm. In the picture b of FIG. 16, the rotation angle θ is 10 degrees, and the diameter D of the circumferential distribution formed by the connecting portions 131 is 60 mm. In the picture c of FIG. 16, the rotation angle θ is 20 degrees, and the diameter D of the circumferential distribution formed by the connecting portions 131 is 80 mm. In the picture d of FIG. 16, the rotation angle θ is 50 degrees, and the diameter D of the circumferential distribution formed by the connecting portions 131 is 105 mm. In the picture a1 of FIG. 17, the rotation angle θ is 0 degrees, and the diameter D of the circumferential distribution formed by the connecting portions 131 is 40 mm. In the picture b1 of FIG. 17, the rotation angle θ is 10 degrees, and the diameter D of the circumferential distribution formed by the connecting portions 131 is 60 mm. In the picture c1 of FIG. 17, the rotation angle θ is 20 degrees, and the diameter D of the circumferential distribution formed by the connecting portions 131 is 80 mm. In the picture d1 of FIG. 17, the rotation angle θ is 50 degrees, and the diameter D of the circumferential distribution formed by the connecting portions 131 is 105 mm.

In the embodiment, when each of the first guide elements 141 moves to the first end of the corresponding first adapter body guide groove 111a and the first end of the corresponding first rotating ring guide groove 121a, and when each of the second guide elements 142 moves to the first end of the corresponding second adapter body guide groove 112a and the first end of the corresponding second rotating ring guide groove 122a, the diameter D of the circumferential distribution formed by the connecting portions 131 is smallest, which is 40 mm. At this time, the adjacent sliding connecting pieces are connected to each other to from a circle.

When each of the first guide elements 141 moves to the second end of the corresponding first adapter body guide groove 111b and the second end of the corresponding first rotating ring guide groove 121b, and when each of the second guide elements 142 moves to the second end of the corresponding second adapter body guide groove 112b and the second end of the corresponding second rotating ring guide groove 122b, the diameter D of the circumferential distribution formed by the connecting portions 131 is largest, which is 105 mm. At this time, the adjacent sliding connecting pieces 130 are farthest apart, and each of the sliding connecting pieces 130 is close to the outer edge of the rotating ring. In the embodiment, the rotation angle θ of the rotating ring 120 with respect to the adapter body 110 ranges from 0-50 degrees and the diameter D of the circumferential distribution formed by the connecting portions 131 ranges from 40-105 mm. However, it should be understood that in other embodiments, the rotation angle θ of the rotating ring 120 with respect to the adapter body 110 may be larger or smaller as required. For example, the rotation angle θ may range from 0-90 degrees, and the diameter D of the circumferential distribution formed by the connecting portions 131 may range from 20-200 mm.

Embodiment 2

The embodiment 2 is basically the same as the Embodiment 1 and the adapter thereof can be referred to FIGS. 1-17 (since the structure is basically the same, no new drawings are added), the only difference is that the number of sliding connecting pieces 130 is three. The rotating ring 120 comprises first rotating ring guide grooves 121 and second rotating ring guide grooves 122 corresponding to the sliding connecting pieces 130. The adapter body 110 comprises first adapter body guide grooves 111 and second adapter body guide grooves 112 corresponding to the sliding connecting pieces 130. Each of the sliding connecting pieces 130 corresponds to one first rotating ring guide groove 121, one second rotating ring guide groove 122, one first adapter body guide groove 111 and one second adapter body guide groove 112.

Embodiment 3

The embodiment 3 is basically the same as the Embodiment 1. As shown in FIGS. 1-7 and 18-19, the adapter 100 comprises an adapter body 110, a rotating ring 120, and eight sliding connecting pieces 130.

The adapter body 110 is hollow. An interface matched and connected with a photographic accessory is arranged on a first side of the adapter body 110. The rotating ring 120 is rotatably connected to a second side 110b of the adapter body 110. The rotating ring 120 comprises first rotating ring guide grooves 121 separately corresponding to a corresponding sliding connecting piece and second rotating ring guide grooves 122 separately corresponding to a corresponding sliding connecting piece 130. The adapter body 110 comprises first adapter body guide grooves 111 separately corresponding to a corresponding sliding connecting piece 130 and second adapter body guide groove 112 separately corresponding to a corresponding sliding connecting piece 1130. Each of the first rotating ring guide grooves 121 corresponds to a corresponding second rotating ring guide groove 122.

Each sliding connecting piece 130 is fixedly connected to a first guide element 141 and a second guide element 142. Each of the first guide elements 141 passes through a corresponding first rotating ring guide groove 121 to slidably connect to a corresponding first adapter body guide groove 111. Each of the second guide elements 142 passes through a corresponding second rotating ring guide groove 122 to slidably connect to a corresponding second adapter body guide groove 112. Each sliding connecting piece 130 is slidably connected to a corresponding first rotating ring guide groove 121, a corresponding second rotating ring guide groove 122, a corresponding first adapter body guide groove 111, and a corresponding second adapter body guide groove 112 by a corresponding first guide element 141 passing through the corresponding first rotating ring guide groove 121 and a corresponding second guide element 142 passing through the corresponding second rotating ring guide groove 122, so each sliding connecting piece moves along the corresponding first rotating ring guide groove 121, the corresponding second rotating ring guide groove 122, the corresponding first adapter body guide groove 111, and the corresponding second adapter body guide groove 112 when the rotating ring 120 rotates with respect to the adapter body 110. Each of the first guide elements 141 corresponds to each of the first rotating ring guide grooves 121 and each of the first adapter body guide grooves 111. The second guide element 142 corresponds to the second rotating ring guide groove 122 and the second adapter body guide groove 112;

Each sliding connecting piece 130 comprises a connecting portion 131. When each sliding connecting piece 131 moves along the corresponding first rotating ring guide groove 121, the corresponding second rotating ring guide groove 122, the corresponding first adapter body guide groove 111, and the corresponding second adapter guide groove 112, configurations of the corresponding first rotating ring guide groove 121, the corresponding second rotating ring guide groove 122, the corresponding first adapter body guide groove 111, and the corresponding second adapter guide groove 112 of each sliding connecting piece 130 make the connecting portions 131 of the sliding connecting pieces to move close or away from the rotating ring 120 to form a circumferential distribution along a direction perpendicular to an axial direction of the rotating ring 120 to fit a camera lens.

Figure 18:
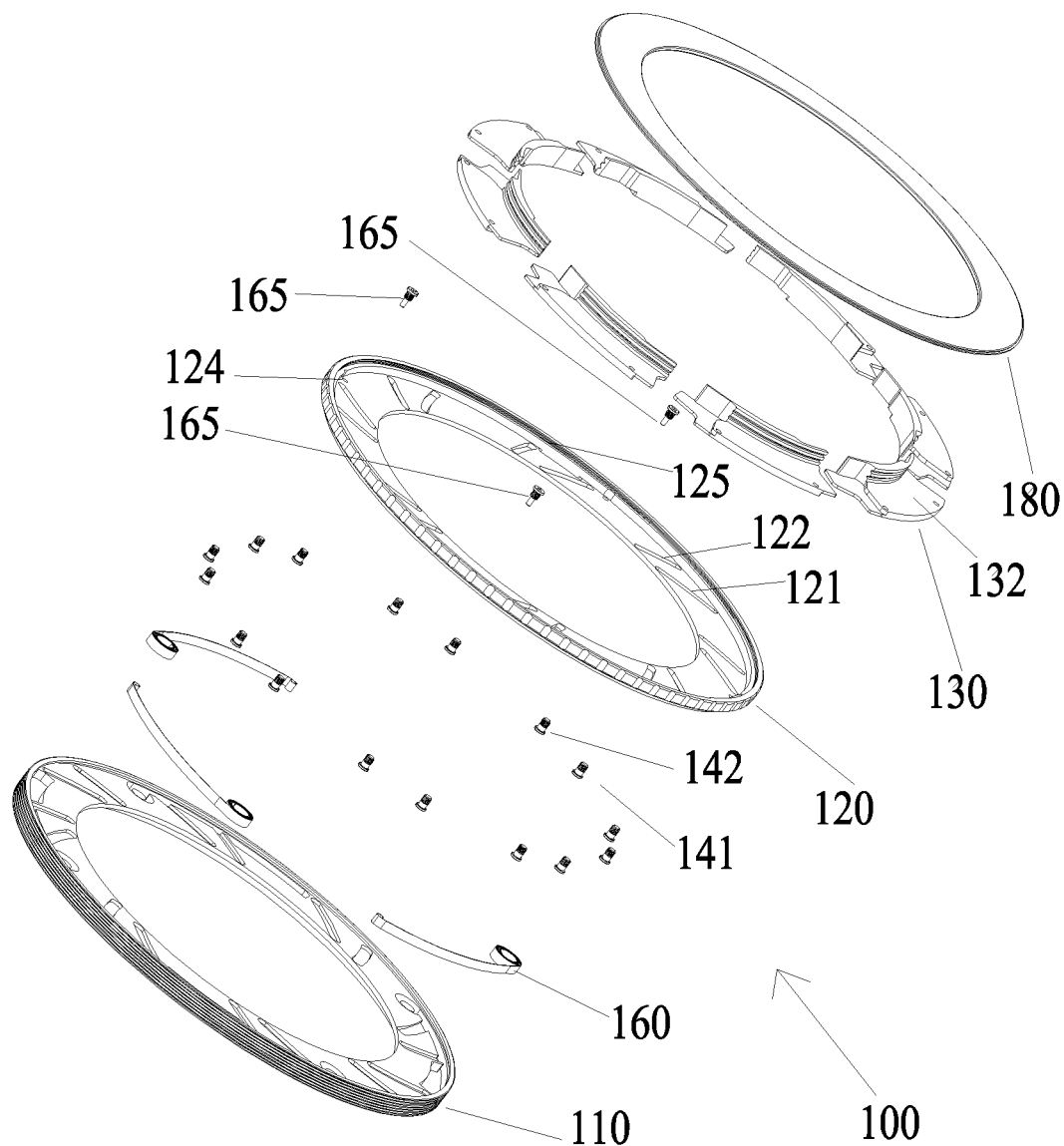
FIG. 18 is an exploded schematic diagram of the adapter of a third embodiment of the present disclosure.
Figure 19:
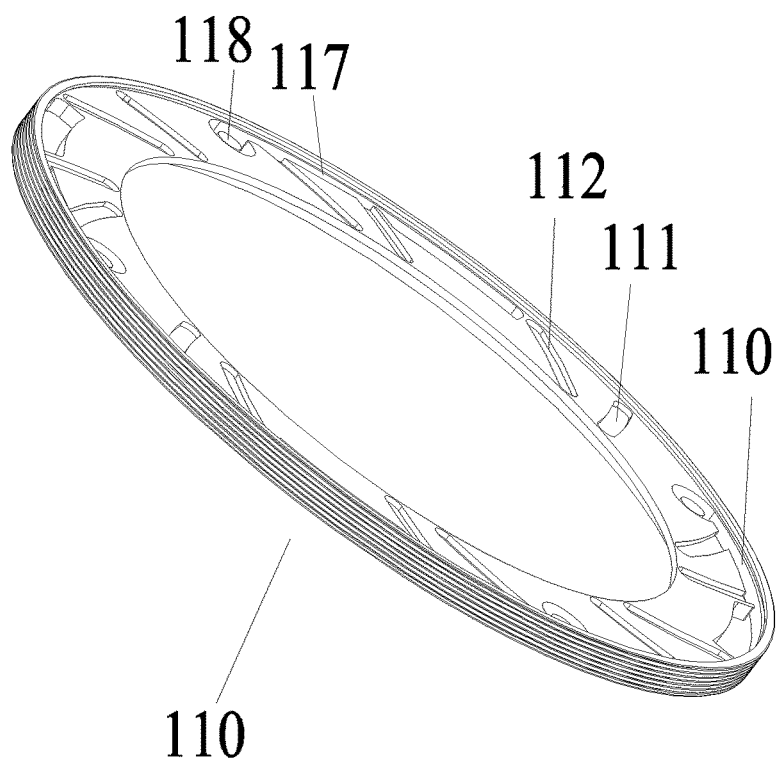
FIG. 19 is a schematic diagram of the adapter body of the third embodiment of the present disclosure.
Figure 20:
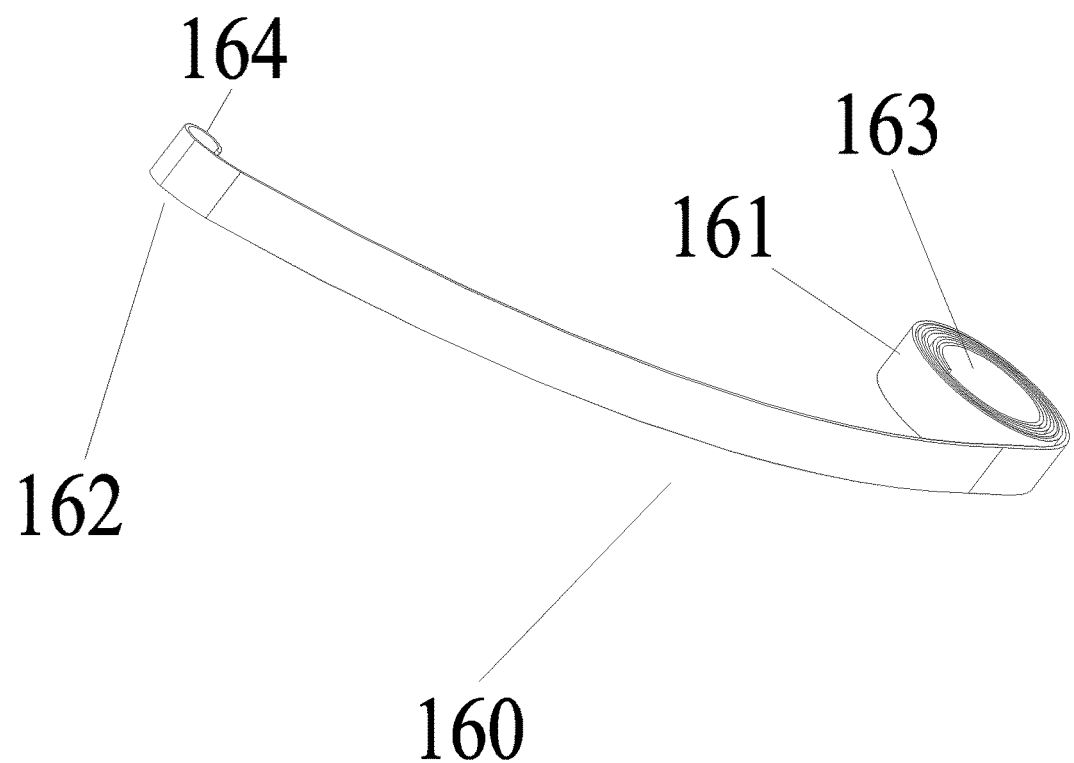
FIG. 20 is a schematic diagram of a coil spring of the third embodiment of the present disclosure.

As shown in FIGS. 18-20, a difference between the Embodiment 3 and Embodiment 1 is that: the adapter of the Embodiment 3 comprises elastic pieces. The elastic pieces are arranged in the adapter body. The elastic pieces are configured to realize automatic locking of the sliding connecting pieces 130. The elastic pieces replace the stop piece in Embodiment 1. Specifically, the elastic pieces are coil springs 160. As shown in FIG. 20, the coil springs 160 are arc shaped. Each of the coil springs 160 has a cylindrical first end 161 and a cylindrical second end 162 of the coil spring. The cylindrical first end 161 of each of the coil springs is rotatably connected to the adapter body 110. The cylindrical second end 162 of each of the coil springs is fixedly connected with the rotating ring 120.

Mounting grooves 117 configured to receive the coil springs are provided on one side of the adapter body 110 facing the rotating ring 120. A shape of each of the mounting grooves 117 is matched with a shape of each of the coil springs 160. The rotating ring 120 comprises first fixing holes 124 separately configured to fix the cylindrical second end 162 of each of the coil springs. A positioning post 118 corresponding to the cylindrical first end 161 of each of the coil springs is arranged on one end of each of the mounting grooves 117. The cylindrical first end 161 of each of the coil springs defines a positioning hole 163 corresponding to a corresponding positioning post 118. The cylindrical second end 162 of each of the coil springs defines a second fixing hole 164. When mounting the adapter, each of the coil springs 160 is put into a corresponding mounting groove 117, and each positioning post 118 is inserted into a corresponding positioning hole 163, so the cylindrical first end 161 of each of the coil springs is positioned and is rotatable around the corresponding positioning hole 163 under action of external force. A fastening piece 165 passes through each first fixing hole 124 and each second fixing hole 164 to fix the cylindrical second end 162 of each of the coil springs to the rotating ring 120.

In the embodiment, four mounting grooves 117 is provided on the adapter body 110, and the coil springs 160 are correspondingly installed in three of the four mounting grooves 117. It should be understood that in other embodiments, one coil spring 160 is installed as required, or two or four coil springs 160 may be installed. Correspondingly, in other embodiments, one or more mounting grooves 117 may be provided on the adapter body 110 as required, and one or more coil springs 160 may be installed accordingly.

When using the adapter 100, the rotation angle of the rotating ring 120 with respect to the adapter body 110 is adjusted as required, so as to adjust the diameter of the circumferential distribution formed by the connecting portions 131. In the embodiment, when the rotating ring 120 rotates with respect to the adapter body 110, the diameter of the circumferential distribution formed by the connecting portions 131 is the same as that of the Embodiment 1. Details of the circumferential distribution formed by the connecting portions 131 may be referred to the Embodiment 1, which will not be repeated herein. Since the cylindrical first end 161 of each of the coil springs is rotatably connected to the adapter body 110, the cylindrical second end 162 of each of the coil springs is fixed to the rotating ring 120. When the rotating ring 120 rotates with respect to the adapter body 110, the cylindrical second end 162 of each of the coil springs is pulled along with the rotation of the rotating ring 120. Therefore, each of the coil springs 160 is deformed to generate an elastic force to lock the connecting portions to the photographic accessory.

In addition, in order to further prevent light leakage between the sliding connecting pieces 130, the adapter 100 further comprises a light blocking ring 180. The rotating ring 120 comprises an annular side wall 125. The light blocking ring 180 is arranged on the sheet-shaped bodies 132 of the sliding connecting pieces 130, an annular mounting groove corresponding to the light blocking ring 180 is provided on the annular side wall 125, the light blocking ring 180 is inserted into the annular mounting groove and is fixed to the rotating ring 120.

What is claimed is:

1. An adapter, comprising:
an adapter body, wherein the adapter body is hollow; an interface matched and connected with a photographic accessory is arranged on a first side of the adapter body;
a rotating ring rotatably connected to a second side of the adapter body;
at least three sliding connecting pieces;
wherein the rotating ring comprises rotating ring guide grooves; each sliding connecting piece is corresponding to at least two rotating ring guide grooves; the adapter body comprises adapter body guide grooves; each sliding connecting piece is corresponding to at least two adapter body guide grooves; each rotating ring guide groove is corresponding to each adapter body guide grooves; each sliding connecting piece is fixedly connected to corresponding at least two guide elements; each of the guide elements passes through a corresponding rotating ring guide groove to slidably connect to a corresponding adapter body guide groove; each sliding connecting piece is slidably connected to corresponding at least two rotating ring guide grooves and corresponding at least two adapter body guide grooves by corresponding at least two guide elements passing through the corresponding at least two rotating ring guide grooves; so each sliding connecting piece moves along the corresponding at least two rotating ring guide grooves and the corresponding at least two adapter body guide grooves when the rotating ring rotates with respect to the adapter body;

wherein the at least two guide elements corresponding to each sliding connecting piece are in one-to-one correspondence with the at least two rotating ring guide grooves corresponding to each sliding connecting piece and are in one-to-one correspondence with the at least two adapter body guide grooves corresponding to each sliding connecting piece;

wherein each sliding connecting piece comprises a connecting portion when each sliding connecting piece moves along the corresponding at least two rotating ring guide grooves and the corresponding at least two adapter body guide grooves, configuration of the corresponding at least two rotating ring guide grooves and configuration of the corresponding at least two adapter body guide grooves of each sliding connecting piece make the connecting portions of the at least three sliding connecting pieces to form a circumferential distribution; a diameter of the circumferential distribution formed by the connecting portions increases or reduces along with movement of the connecting portions to fit a camera lens.

2. The adapter according to claim 1, wherein the at least two rotating ring guide grooves corresponding to each sliding connecting piece comprise a first rotating ring guide groove and a second rotating ring guide groove; the first rotating ring guide grooves form a circumferential distribution along the rotating ring and the second rotating ring guide grooves form a circumferential distribution along the rotating ring; the at least two guide elements corresponding to each sliding connecting piece comprise a first guide element and a second guide element; the at least two adapter body guide grooves corresponding to each sliding connecting piece comprise a first adapter body guide groove and a second adapter body guide groove;

wherein the first adapter body guide grooves form a circumferential distribution along the adapter body and the second adapter body guide grooves form a circumferential distribution along the adapter body; each of the first guide elements passes through a corresponding first rotating ring guide groove; a first end of each of the first guide elements is connected with a corresponding sliding connecting piece; a second end of each of the first guide elements is slidably connected with a corresponding first adapter body guide groove; each of the second guide elements passes through a corresponding second rotating ring guide groove; a first end of each of the second guide elements is connected with a corresponding sliding connecting piece; a second end of each of the second guide elements is slidably connected with a corresponding second adapter body guide groove;

wherein an orthographic projection of each of the first rotating ring guide grooves on a plane where the adapter body is located intersects with a corresponding first adapter body guide groove at a position of a corresponding first guide element; an orthographic projection of each of the second rotating ring guide grooves on the plane where the adapter body is located intersects with a corresponding second adapter body guide groove at a position of a corresponding second guide element.

3. The adapter according to claim 2, wherein a first end of each of the first rotating ring guide grooves is spaced apart from a first end of each of the second rotating ring guide grooves; the first end of each of the first rotating ring guide grooves and the first end of each of the second rotating ring guide grooves are separately arranged close to an outer edge of the rotating ring; a second end of each of the first rotating ring guide grooves is spaced apart from a second end of each of the second rotating ring guide grooves; the second end of each of the first rotating ring guide grooves and the second end of each of the second rotating ring guide grooves are separately arranged close to an inner edge of the rotating ring;

wherein a first end of each of the first adapter body guide grooves is spaced apart from a first end of each of the second adapter body guide grooves; the first end of each of the first adapter body guide grooves and the first end of each of the second adapter body guide grooves are separately arranged close to the outer edge of the rotating ring; a second end of each of the first adapter body guide grooves is spaced apart from a second end of each of the second adapter body guide grooves; the second end of each of the first adapter body guide grooves and the second end of each of the second adapter body guide grooves are separately arranged close to the inner edge of the rotating ring.

4. The adapter according to claim 2, wherein each sliding connecting piece comprises a sheet-shaped body forming a sector ring; each sheet-shaped body comprises a first mounting hole and a second mounting hole, each of the connecting portions is arranged on an upper side of a corresponding sheet-shaped body; a first end of each of the first guide elements is threadedly connected with a corresponding first mounting hole; each sheet-shaped body is separately slidably connected with a corresponding first rotating ring guide groove and a corresponding first adapter body guide groove through a corresponding first guide element; a second end of each of the second guide elements is threadedly connected with a corresponding second mounting hole; each sheet-shaped body is separately slidably connected with a corresponding second rotating ring guide groove and a corresponding second adapter body guide groove through a corresponding second guide element.

5. The adapter according to claim 1, wherein the first side of the adapter body is provided with a first annular groove matched and connected with the photographic accessory; the first annular groove forms the interface.

6. The adapter according to claim 1, wherein the connecting portions are protruding portions arranged on the at least three sliding connecting pieces; each of the protruding portions protrudes away from the adapter body in an axial direction of the adapter body; the protruding portions are configured to fit and connect to the camera lens.

7. The adapter according to claim 6, wherein the protruding portions are arc plates axially extending in the axial direction of the adapter body away from the adapter body; the arc plates of the connecting portions form a circumferential distribution; and the arc plates are connected with the camera lens through threads.

8. The adapter according to claim 1, wherein a stop piece is arranged on the adapter body; the stop piece is configured to prevent the rotating ring from rotating with respect to the adapter body, so as to stop the connecting portions.

9. The adapter according to claim 8, wherein a second annular groove is provided on the second side of the adapter body; the rotating ring is embedded in the second annular groove to rotatably connect to the adapter body; a threaded through hole communicated with the second annular groove is on a circumferential side wall of the adapter body; the stop piece is a screw screwed with the threaded through hole; the screw passes through the threaded through hole and moves along the threaded through hole to abut against or away from the rotating ring.

10. The adapter according to claim 1, wherein each sheet-shaped body comprises a first end of each sheet-shaped body and a second end of each sheet-shaped body; a first light blocking portion is arranged on the first end of each sheet-shaped body; a second light blocking portion is arranged on the second end of each sheet-shaped body; both of a thickness of each first light blocking portion and a thickness of each second light blocking portion are less than a thickness of each sheet-shaped body; each first light blocking portion and each second light blocking portion are sheet-shaped structures; when adjacent sheet-shaped bodies are moved to close to each other, each first light blocking portion overlaps a corresponding second light blocking portion.

11. The adapter according to claim 1, wherein the adapter body further comprises elastic pieces configured to automatically lock the at least three sliding connecting pieces.

* * * * *